Dec. 5, 1961 E. A. FERRIS ET AL 3,011,606
ROLLER CLUTCH
Filed July 26, 1957 2 Sheets-Sheet 2
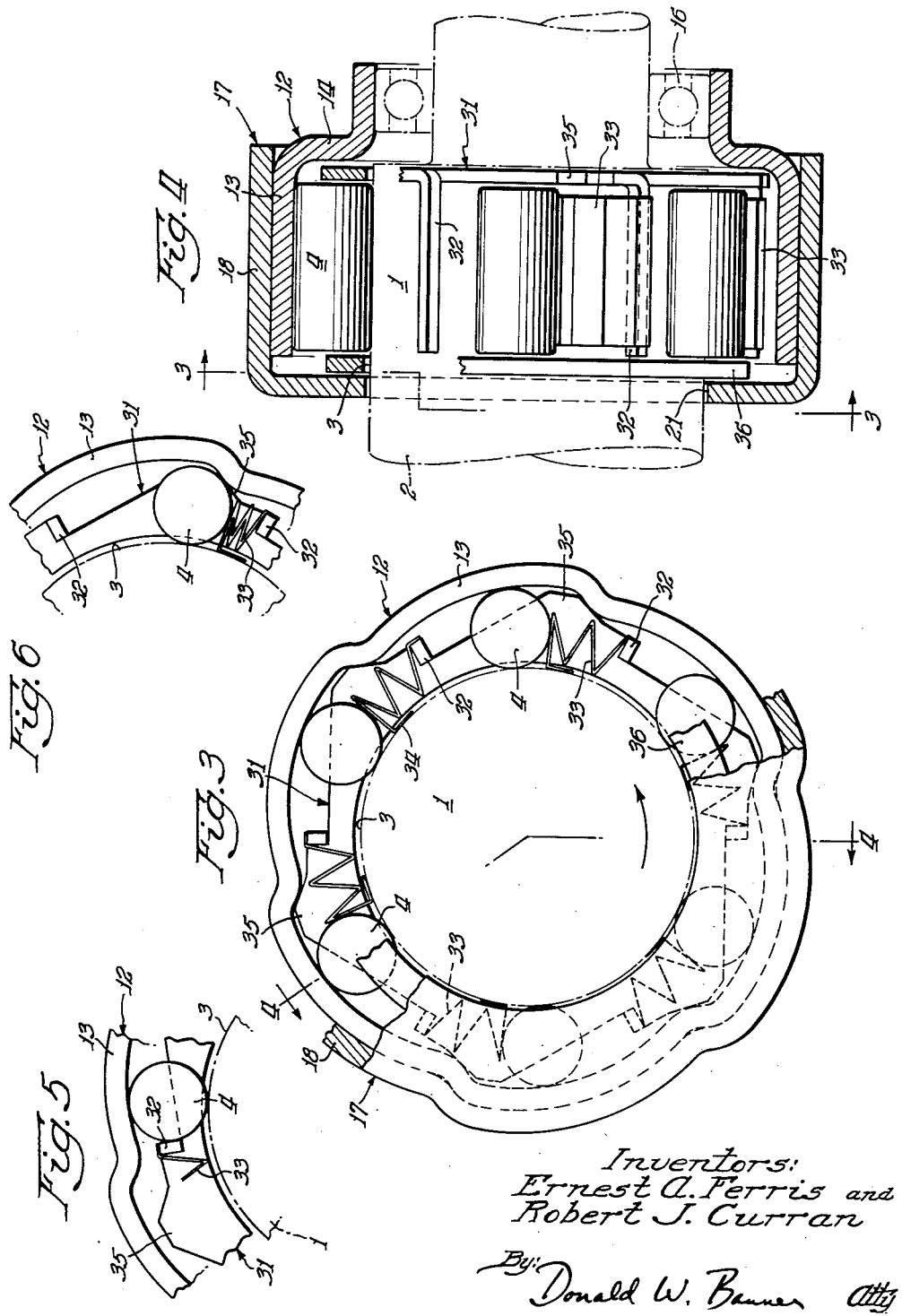
Inventors:
Ernest A. Ferris and
Robert J. Curran
By: Donald W. Banner Atty

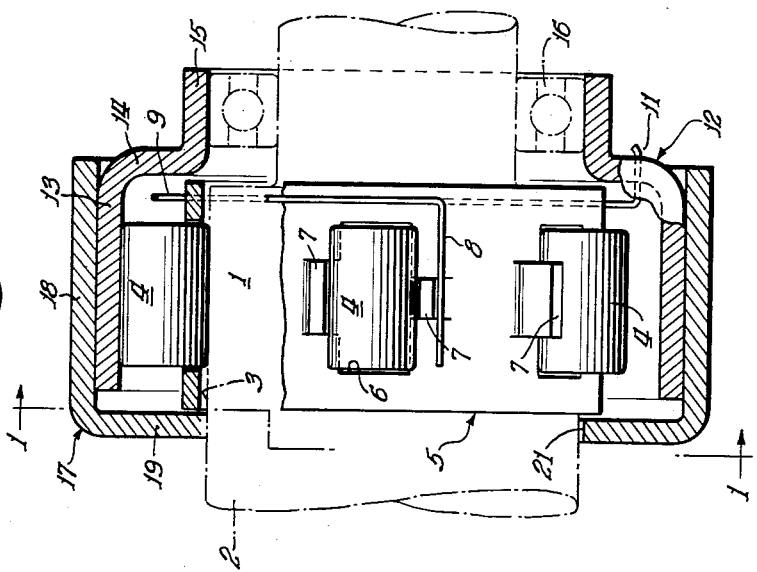
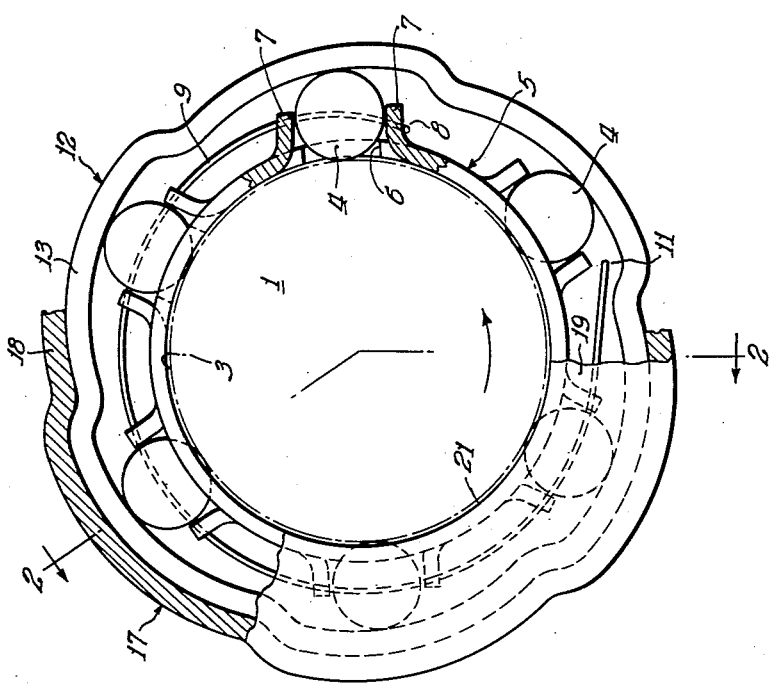

United States Patent Office 3,011,606
Patented Dec. 5, 1961

3,011,606
ROLLER CLUTCH
Ernest A. Ferris, Downers Grove, and Robert J. Curran, Chicago, Ill., assignors to Borg-Warner Corporation, Chicago, Ill., a corporation of Illinois
Filed July 26, 1957, Ser. No. 674,454
17 Claims. (Cl. 192—45)

This invention relates to one-way engaging devices, and more particularly to roller type one-way clutches or brakes.

One-way clutches or brakes of the roller type are well known, and generally include a plurality of rollers, a plurality of roller biasing means, an inner race and an outer race, one of the races having a cylindrical surface while the opposite race is formed to have camming surfaces. It is generally the practice to form the race camming surfaces by machining the races and, generally speaking, this is an expensive operation.

It is therefore one object of the present invention to provide a new and improved roller clutch or brake which is less expensive to manufacture.

Another object is the provision of a device in accordance with the preceding object in which the race cams are formed rapidly and inexpensively, the cammed race comprising a drawn cup.

Another object is the provision of a device in accordance with the preceding objects in which a second drawn cup of sheet metal is utilized, facing in the direction opposite to the first cup and shaped complementarily thereto.

Another object is the provision of a device in accordance with the preceding objects in which cage means are provided which assure common movement of the rollers, the cage means also permitting easy handling and installation of the clutch or brake.

Another object is the provision of a device in accordance with the preceding objects in which a single energizing spring is employed which energizes all of the rollers.

Other objects and features of the invention will be readily apparent to those skilled in the art from the specification and appended drawings illustrating certain preferred embodiments in which:

FIGURE 1 is an end view of a device incorporating the principles of the present invention, with parts broken away to facilitate the illustration, substantially along the plane of line 1—1 of FIGURE 2;

FIGURE 2 is a sectional view along the plane of line 2—2 of FIGURE 1;

FIGURE 3 is a view similar to FIGURE 1 of a modified device incorporating certain principles of the present invention, the view being taken substantially along the plane of line 3—3 of FIGURE 4;

FIGURE 4 is a sectional view along the plane of line 4—4 of FIGURE 3;

FIGURES 5 and 6 are fragmentary views of the mechanism illustrated in FIGURE 3 illustrating the rollers in extreme driving and extreme overrunning conditions respectively.

Considering first the form of the present invention illustrated in FIGURES 1 and 2, in FIGURE 1 there is shown an inner race 1 formed as an integral part of a shaft 2, and having an annular outer periphery or surface 3. In engagement with the surface 3 are a plurality of circumferentially spaced, cylindrical rollers 4. The rollers 4 are positioned in a cage indicated in general by the numeral 5 which is provided with a plurality of spaced openings 6—smaller than the maximum diameter of the rollers—through which the rollers extend to engage the surface 3. The cage is also provided with a plurality of pairs of generally radially extending lugs 7, integral with the cage and projecting radially outwardly from the central portion thereof, each of the rollers 4 being received between a pair of the lugs 7. Against one of the lugs 7 there is disposed one end portion 8 of a torsion spring 9. The spring 9 has an end portion 11 fixedly attached to an outer race, indicated in general by the numeral 12. The outer race 12 is a sheet metal cup formed by punch press operations and comprises a cammed, longitudinally extending cup wall section 13, a radially extending section 14 and a longitudinally extending section 15. Section 15 is supported from the shaft 2 by suitable bearing means 16, and is adapted for connection to a flange portion (not shown) of a driven member. As best illustrated in FIGURE 1, the section 13 of outer race 12 has portions of differing radial spacing from the center of the race 1 so that when the rollers 4 are moved in a clockwise direction from the position illustrated in that figure, there will be no driving relation between the race 1 and the race 12, and so that when the rollers 4 are moved in a counterclockwise direction from the position indicated in FIGURE 1, torque will be transmitted from the race 1 to the race 12. It will be noted that the thickness of the cup wall section 13 is substantially uniform and that the outside surface of the wall section 13 opposite the race surface adapted to contact the rollers is of substantially the same configuration as the roller contacting surface. This is clearly shown in FIGS. 1 and 3. The spring 9 is designed to position the cage 5 so that the rollers 4 are only lightly in contact with both the races 1 and 12.

Superimposed upon the race 12 is a second, oppositely facing sheet metal cup, indicated in general by the numeral 17, also formed by punch press operations, which has a longitudinally extending section 18 complementary in contour, as illustrated in FIGURE 1, to section 13 on the race 12. Cup 17 also has a radially extending section 19, parallel to the section 14 on the race 12, section 19 having a central, circular opening 21 therein through which the shaft 2 extends. It should be noted that the section 14 on the race 12 and the section 19 on the cup 17 prevent undue longitudinal movement of the cage 5. Preferably the end of cup 17 which is most spaced from section 19 is rolled radially inwardly so that an integral "package" of cup 17, race 12, rollers 4, cage 5 and spring 9 is formed; this "package" can then be shipped as a unit and readily slipped over the race 1. The cup 17, prior to its assembly on the race 12, is preferably heated so as to expand slightly and then slipped over the race 12 so that the cup 17 and race 12 are "shrunk fit." The cup 17 then adds substantial stiffness to the outer race 12.

OPERATION

When the race 1 is rotated relative to race 12 in the direction indicated by the arrow in FIGURE 1, its frictional engagement with the rollers 4 will force the rollers in a counterclockwise direction, with the bias of the spring 9. Torque will then be transmitted from the race 1 through the rollers 4 to the outer race 12, and subsequently to the driven member to which this race is attached. When the race 1 is rotated in a clockwise direction relative to the race 12, the rollers 4 will be moved to a position of increased spacing between the inner race 1 and the outer race 12 so that no transmission of torque between these members is accomplished.

It should be noted that the cage 5 not only prevents the rollers 4 from dropping out of the assembly when the unit is not assembled on the race 1 but, in addition, forces common circumferential movement of all of the rollers 4 and keeps the rollers in longitudinal alignment with each other so that each of the rollers 4 will tend to assume and release its load at the same time that the other rollers are assuming and releasing their loads.

*Second embodiment*

In FIGURES 3 through 6 there is shown a modified device incorporating certain of the principles of the present invention. In those figures there is disclosed—as described above—an inner race 1 having a cylindrical surface 3 against which a plurality of circumferentially spaced rollers 4 are disposed, rollers 4 also engaging the camming section 13 of the outer race 12. Outside of the outer race 12 is the cup 17 having a camming section 18 complementary to the outer surface of the caming section 13, as previously described.

Adjacent the section 14 of the outer race 12 is an annular reaction plate, indicated in general by the numeral 31. Plate 31 has a plurality of longitudinally extending integral prongs 32 against each of which is disposed one end of a pleated spring 33. Each of the springs 33 engages the adjacent roller 4, and is provided with a radially inner portion 34 in engagement with the inner race 1. Plate 31 has a plurality of projections 35 respectively adapted, as shown in FIGURE 3, to engage one of the radially depressed portions of the camming section 13 on the race 12 when the device is in the overrunning condition, projections 35 thereby limiting travel of the reaction plate 31 during the overruning condition. An annular spacer 36 is provided adjacent the rollers 4 on the side spaced from the plate 31.

OPERATION

When the inner race 1 is rotated in a counterclockwise direction as illustrated by the arrow in FIGURE 3, the rollers 4—biased by the springs 33 toward the position illustrated in FIGURE 3 in which the rollers are in light engagement with both of the races—are moved counterclockwise. They therefore wedge between the inner race 1 and the camming section 13 on the outer race 12 so that torque is transmitted from the inner race 1 to the outer race 12. In FIGURE 5 there is shown the condition of maximum "lock up" of the device, in which the rollers 4 are very firmly wedged between the inner and outer races; it should be noted that in this position the reaction plate 31 does not interfere with this movement of the rollers, but rather floats relative to the races, permitting full use of the cams on section 13. When the race 1 is rotated in a clockwise direction, the rollers will move away from the position illustrated in FIGURE 5 toward that illustrated in FIGURE 3 so that no further torque transmittal between the races occurs. If the relative rotation of race directions occurs very rapidly when moving from a full load position to an overrunning condition, the rollers 4 will be moved to the position illustrated in FIGURE 6 in which the rollers have been moved into engagement with the radially innermost portions of the section 13 on the race 12. In this condition, rollers 4 are spaced from prongs 32 sufficiently to prevent damage to springs 33. Springs 33 will then return the rollers 4 to the position of light frictional contact with both of the races, this condition being illustrated in FIGURE 3.

SUMMARY

Both of the embodiments of the present invention described above include a pair of oppositely facing, sheet metal cups which together provide a cammed race which is very inexpensive in comparison to machined races, and yet which is sufficiently strong to carry the loads in a great many applications. The outer race 12, in a preferred embodiment, is formed of strip sheet steel which is 0.080 inch thick. To form the strip steel into the requisite configuration, the flat piece initially is drawn into a cup shape which, as illustrated in FIGURES 2 and 4, is "stepped" and has two flanges (sections 13 and 15) separated by the section 14. A generally circular die, having an outer peripheral configuration which conforms to the desired configuration of the radial underside of finished section 13, is placed in this cup in abutting relation with section 14 and contiguous to the underside of the radially outer flange. The cup with this die inside of it is then forced through an outer die which is a flat plate having an opening therein of the desired configuration of the radially outer side of section 13. As the cup is forced through this outer die, the section 13 will be forced to assume the shape illustrated in FIGURES 1 and 3. Cup 17, of the same material as outer race 12, is formed in a similar manner. When the sheet metal members are assembled together with the rollers, cage and spring—as illustrated in FIGURES 1 and 2—or with the rollers, springs, plate and spacer—as illustrated in FIGURES 3 through 6—the resultant one-way clutch or brake is relatively inexpensive, yet durable and suitable for a wide variety of applications. With the embodiment of FIGURES 1 and 2, it shoulld be noted, the "package" comprising the sheet metal cups, rollers, cage and spring may be handled, transported and assembled without danger of disassembly, inasmuch as the rollers are prevented from falling out of the assembly by the cage and sheet metal cups, and the cage and spring are retained in position by the radially extending portions of the sheet metal cups. With this embodiment, also, it is not necessary to use more then one spring. Obviously, however, if an additional spring is desired it could be added, but this is not necessary. In addition, it should be noted that the lugs 7 in this first embodiment—integral with the cage 5—are effective to force substantially common loading and unloading of the rollers 4, which is a definite advantage in many installations, and particularly in those in which torsional vibration is encountered.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A one-way engaging device comprising roller means, spring means for energizing said roller means, and sheet metal race means including a race surface having a plurality of circumferentially spaced portions of gradually varying radial dimension adapted for engagement by said roller means, said sheet metal race means comprising a sheet metal cup having a first section defining an elongated wall section of substantially uniform thickness and further defining a cammed race surface, an integral second section generally perpendicular to said first section adapted to prevent movement of said roller means in one direction, and a third integral section generally parallel to said first section adapted for connection to an exterior member.

2. A one-way engaging device comprising roller means, spring means for energizing said roller means, and sheet metal race means including race surface having a plurality of circumferentially spaced portions of gradually varying radial dimension adapted for engagement by said roller means, said sheet metal race means comprising a sheet metal cup having a first integral section defining an elongated wall section of substantially uniform thickness and further defining a cammed race surface, and including a second sheet metal cup facing in the opposite direction from said first sheet metal cup provided with a first portion in engagement with said first section on said first sheet metal cup whereby said second sheet metal cup rigidizes said first section.

3. A one-way engaging device comprising roller means, spring means for energizing said roller means, and sheet metal race means including a race surface having a plurality of circumferentially spaced portions of gradually varying radial dimension adapted for engagement by said roller means, said sheet metal race means comprising a sheet metal cup having a first integral section defining an elongated wall section of substantially uniform thickness and further defining a cammed race surface, and including a second sheet metal cup facing in the opposite direction from said first sheet metal cup provided with a first portion having a surface in engagement with a surface on said first section on said first sheet metal cup whereby said second sheet metal cup rigidifies said first section, and in which said surfaces are complementary in configuration.

4. A one-way engaging device comprising roller means, spring means for energizing said roller means, annular rigid cage means, opening defining means in said cage means adapted respectively to receive portions of said roller means and through which portions of said roller means extend, rigid projections on said cage means adapted to effect common circumferential movement of said roller means, and sheet metal race means including a race surface having a plurality of circumferentially spaced portions of gradually varying radial dimension adapted for engagement by said roller means.

5. The device defined in claim 4 in which said sheet metal race means comprise a sheet metal cup having a first section forming said race surface, an integral second section generally perpendicular to said first section adapted to prevent movement of said cage means in one direction, and a third integral section generally parallel to said first section adapted for connection to an exterior member.

6. The device defined in claim 4 in which said sheet metal race means comprise a sheet metal cup having a first integral section forming said race surface, and including a second sheet metal cup facing in the opposite direction from said first sheet metal cup provided with a first portion in engagement with said first section on said first sheet metal cup whereby said second sheet metal cup rigidifies said first section.

7. A one-way engaging device comprising a plurality of roller means, annular means axially adjacent said roller means, a plurality of arms on said annular means respectively projecting between adjacent pairs of said roller means, a plurality of spring means respectively disposed between one of said arms and one of said roller means, and sheet metal race means including a race surface having a plurality of circumferentially spaced portions of gradually varying radial dimension adapted for engagement by said roller means.

8. The device defined in claim 7 in which said sheet metal race means comprise a sheet metal cup having a first section defining an elongated wall section of substantially uniform thickness and further defining a cammed race surface, an integral second section generally perpendicular to said first section adapted to prevent movement of said annular means in one direction, and a third integral section generally parallel to said first section adapted for connection to an exterior member.

9. The device defined in claim 7 in which said sheet metal race means comprise a sheet metal cup having a first integral section defining an elongated wall section of substantially uniform thickness and further defining a cammed race surface, and including a second sheet metal cup facing in the opposite direction from said first sheet metal cup provided with a first portion in engagement with said first section on said first sheet metal cup whereby said second sheet metal cup rigidifies said first section.

10. The device defined in claim 7 in which said annular means includes integral parts extending radially therefrom adapted to engage sections of said circumferentially spaced portions on said sheet metal race means during overrunning condition of the device.

11. A one-way engaging device comprising a plurality of roller means, spring means for energizing said roller means; sheet metal race means comprising a sheet metal cup having a first flanged section formed with a plurality of circumferentially spaced portions of gradually varying radial dimension respectively adapted for engagement by said roller means, an integral second section generally perpendicular to said first section adapted to prevent movement of said roller means in one axial direction, and a third integral flanged section generally parallel to said first section adapted for connection to an exterior member; and a second sheet metal cup facing in the opposite direction from said first sheet metal cup provided with a first portion overlying said first section on said first-mentioned sheet metal cup and in engagement therewith and further provided with a second portion generally parallel to said second section on said first-mentioned sheet metal cup whereby said second sheet metal cup rigidifies said first section and prevents movement of said rollers in a direction opposite to said one axial direction.

12. A one-way engaging device comprising an inner cylindrical race, a plurality of roller means in engagement with said inner race, spring means for energizing said roller means, annular rigid cage means, opening defining means in said cage means adapted respectively to receive portions of said roller means and through which portions of said roller means extend into engagement with said inner race, rigid projections on said cage means adapted to effect common circumferential movement of said roller means; outer race means comprising a sheet metal cup having a first flanged section provided with a plurality of circumferentially spaced portions of gradually varying radial dimension respectively adapted for engagement by said roller means, an integral second section generally perpendicular to said first section adapted to prevent movement of said cage means in one axial direction, and a third integral flanged section generally parallel to said first section adapted for connection to an exterior member; and a second sheet metal cup facing in the opposite direction from said first sheet metal cup provided with a first portion overlying said first section on said first-mentioned sheet metal cup and in engagement therewith and further provided with a second portion generally parallel to said second section on said first-mentioned sheet metal cup whereby said second sheet metal cup rigidifies said first section and prevents movement of said cage means in a direction opposite to said one axial direction.

13. A one-way engaging device comprising an inner cylindrical race, a plurality of roller means in engagement with said inner race, annular means axially adjacent said roller means, a plurality of arms on said annular means respectively projecting between adjacent pairs of said roller means, a plurality of spring means respectively disposed between one of said arms and one of said roller means; outer race means comprising a sheet metal cup having a first flanged section provided with a plurality of circumferentially spaced portions of gradually varying radial dimension respectively adapted for engagement by said roller means, an integral second section generally perpendicular to said first section adapted to prevent movement of said annular means in one axial direction, and a third flanged section generally parallel to said first section adapted for connection to an exterior member; and a second sheet metal cup facing in the opposite direction from said first sheet metal cup provided with a first portion overlying said first section on said first-mentioned sheet metal cup and in engagement therewith and further provided with a second portion generally parallel to said second section on said first-mentioned sheet metal cup whereby said second sheet metal cup rigidifies said first section and prevents movements of said roller means in a direction opposite to said one axial direction.

14. The method of manufacturing a one-way engaging device comprising the steps of forming a strip of sheet metal into a sheet metal cup, inserting a die in said cup, forcing said cup with said die disposed therein through a second die to form a plurality of camming surfaces on said cup, removing said die from within said cup, and assembling a plurality of roller means in said cup in engagement respectively with said camming surfaces.

15. A one-way engaging device comprising a cylindrical race, a plurality of roller means in engagement with said cylindrical race, a cammed race including radially offset portions, a reaction member disposed between said two races and adapted for unlimited relative circumferential movement with respect to said cylindrical race and adapted for limited movement with respect to said cammed race, said reaction member including a plurality of cross bars disposed between said two races, means formed on said reaction member for coacting with said radially offset portions of said cammed race to thereby limit the circumferential movement of said reaction member with respect to said cammed race when the device is in an overrunning condition, and spring means respectively disposed between said cross bars and said roller means for energizing each of said roller means to urge said roller means into engagement with said cammed race.

16. A one-way engaging device comprising an inner cylindrical race, a plurality of roller means in engagement with said inner race, an outer cammed race including radially depressed portions, a reaction member disposed between said two races and adapted for unlimited relative circumferential movement with respect to said cylindrical race and adapted for limited movement with respect to said cammed race, said reaction member including a plurality of cross bars disposed between said two races, means formed on said reaction member for coacting with said radially depressed portions of said cammed race to thereby limit the circumferential movement of said reaction member with respect to said cammed race when the device is in an overrunning condition, and individual spring means respectively disposed between said cross bars and said roller means for individually energizing each of said roller means to urge said roller means into engagement with said cammed race.

17. A one-way engaging device comprising a cylindrical race, a plurality of roller means in engagement with said cylindrical race, a cammed race including radially offset portions, a reaction member disposed between said two races and adapted for unlimited relative circumferential movement with respect to said cylindrical race and removably connected to said cammed race, said reaction member including a plurality of cross bars disposed between said two races, means formed on said reaction member for coacting with said radially offset portions of said cammed race to provide said removable connection therewith, and spring means respectively disposed between said cross bars and said roller means to urge said roller means into engagement with said cammed race.

References Cited in the file of this patent

UNITED STATES PATENTS

| | | |
|---|---|---|
| 1,142,574 | Huck | June 8, 1915 |
| 1,834,722 | Mullen | Dec. 1, 1931 |
| 2,504,173 | Banker | Apr. 18, 1950 |
| 2,691,896 | Stageberg | Oct. 19, 1954 |
| 2,704,230 | Roschlau | Mar. 15, 1955 |
| 2,705,552 | Cross | Apr. 5, 1955 |
| 2,725,134 | Pohl | Nov. 29, 1955 |
| 2,843,238 | Rozner | July 15, 1958 |
| 2,864,478 | Harter et al. | Dec. 16, 1958 |
| 2,902,125 | House et al. | Sept. 1, 1959 |

Disclaimer 3,011,606.—*Ernest A. Ferris*, Downers Grove, and *Robert J. Curran*, Chicago, Ill. ROLLER CLUTCH. Patent dated Dec. 5, 1961. Disclaimer filed June 10, 1965, by the assignee, *Borg-Warner Corporation*; the inventors assenting.

Hereby enters this disclaimer to claims 15, 16 and 17 of said patent.

[*Official Gazette July 20, 1965.*]